C. W. Clewley,
Making Watch-Rims,
N° 25,318.  Patented Sep. 6, 1859.
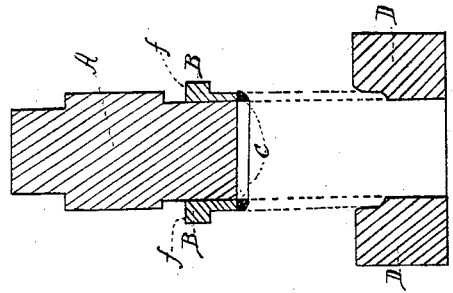
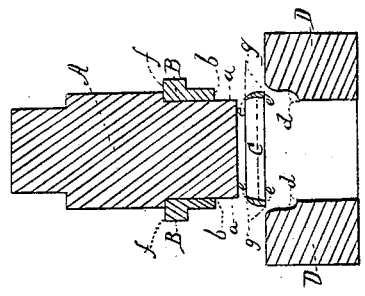 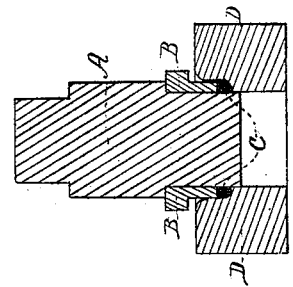
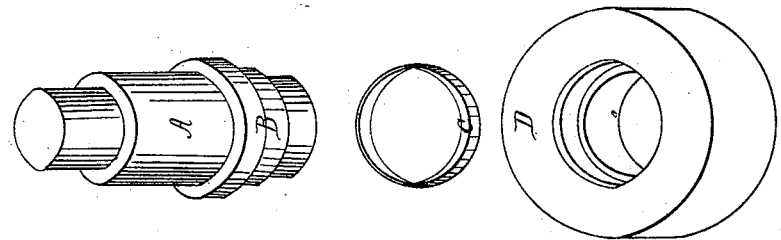
Witnesses:
J. A. Bradford
F. E. Gleason.
Inventor:
Charles W. Clewley

UNITED STATES PATENT OFFICE.

CHARLES W. CLEWLEY, OF PROVIDENCE, RHODE ISLAND.

MACHINE FOR MAKING WATCH-RIMS, &c.

Specification of Letters Patent No. 25,318, dated September 6, 1859.

*To all whom it may concern:*

Be it known that I, CHARLES W. CLEWLEY, of Providence, in the county of Providence and State of Rhode Island, have invented a new and Improved Machine for Making Rims for Watches, Lockets, and other Purposes; and I hereby declare that the following is a full description thereof, reference being had to the accompanying drawings and to the letters of reference marked thereon.

The nature of my invention consists in the combination of the male plunger (A,) with the female plunger (B,) for the purposes set forth.

As will be seen, the female plunger of itself and in combination with the male plunger and the former, performs three distinct offices: In combination with the former, it rolls the stock or rim and forces the two edges, *e, e*, together; in combination with the male plunger, it gives the rim its proper shape; and of itself it acts as a freeing collar to clear the rim from the male plunger. In the manufacture of rims, by a simple process, I cut and turn sheet stock into the shape shown in Figure I, C. I now desire to turn the stock still farther, so that the edges, *e, e*, may be brought together, and that that portion of the surface of the rim which is upon the outside of the circle formed by the rim (Fig. II, *g*,) and which was on one side of the stock in the sheet, may form the whole surface of the rim. To accomplish these ends, is the object of the machine which I have invented.

In order that others skilled in the art may make and use my invention, I will proceed to describe its construction and operation.

In the accompanying drawings Fig. I, is a perspective view of A, the male plunger; B, the female plunger; C, the stock ready for the process, and D, the former. Fig. II, is a vertical section of the same, showing the stock or rim, C, ready for the male and female plungers, A, and B, to fall and press it into the former. Fig. III, shows the male and female plungers, A, and B, down upon the stock or rim, which they have forced into the former. Fig. IV, shows the male plunger raised from the former, D, with the female plunger, B, down upon it to free the finished rim, C.

I place my stock, which has been prepared for the process, into the former, as shown in Fig. II, and by operating any common press into which the plungers have been secured, force the lower end of the male plunger into and the lower surface of the female plunger, B, down upon the stock or rim. The plungers descend to their lowest point, and the relative position of the several parts, at this stage of the process are shown in Fig. III. Having turned the rim and pressed it into its desired shape, I raise the plungers. The rim has been pressed against and of necessity firmly adheres to the male plunger. To remove it without injury, I have constructed the female plunger so that it may act as a freezing collar. The plungers having been raised sufficiently high, the female plunger is stopped by a stationary piece which comes into contact with its upper surface, *f*. The male plunger continues to move upward until the rim is freed, as is seen in Fig. IV.

The important advantage resulting from the use of the machine described, is: that, when stock plated upon one side only, be used, the plating is made to form the whole surface of the rim, the base metal being upon the inside entirely; while in every other method of manufacture known to me, whether that patented by Bloomer, Phillips or by Allen, if plated stock be used, the base metal can clearly, and is necessarily seen, if the rim is examined.

The surface, *b*, of the female plunger and the impression sides, *d*, of the former may be constructed of any desirable shape, giving to the rim a corresponding impression.

It it be desirable, the sides of the rim inclosed by the circle it forms may be left concave. By making the pressure of the plungers upon the stock heavy, the edges, *e, e*, are brought together, as shown in Fig. III. A lighter pressure leaves them spread. Thus is formed a concave which will vary with the pressure of the plungers.

Instead of the female plunger, two or more sliding bars, working in grooves in the male plunger, may be used to free the rim from the male plunger.

Having described my invention, what I claim as new and desire to secure by Letters Patent, is:

The combination of the male and female plungers substantially as described, and for the purposes set forth.

CHARLES W. CLEWLEY.

Witnesses:
F. E. GLEASON,
I. A. BRADFORD.